May 1, 1956     G. O. TURNBULL ET AL     2,743,571
GRAIN TANK DISCHARGE CONVEYOR FOR HARVESTERS
Filed Oct. 9, 1952     3 Sheets-Sheet 1
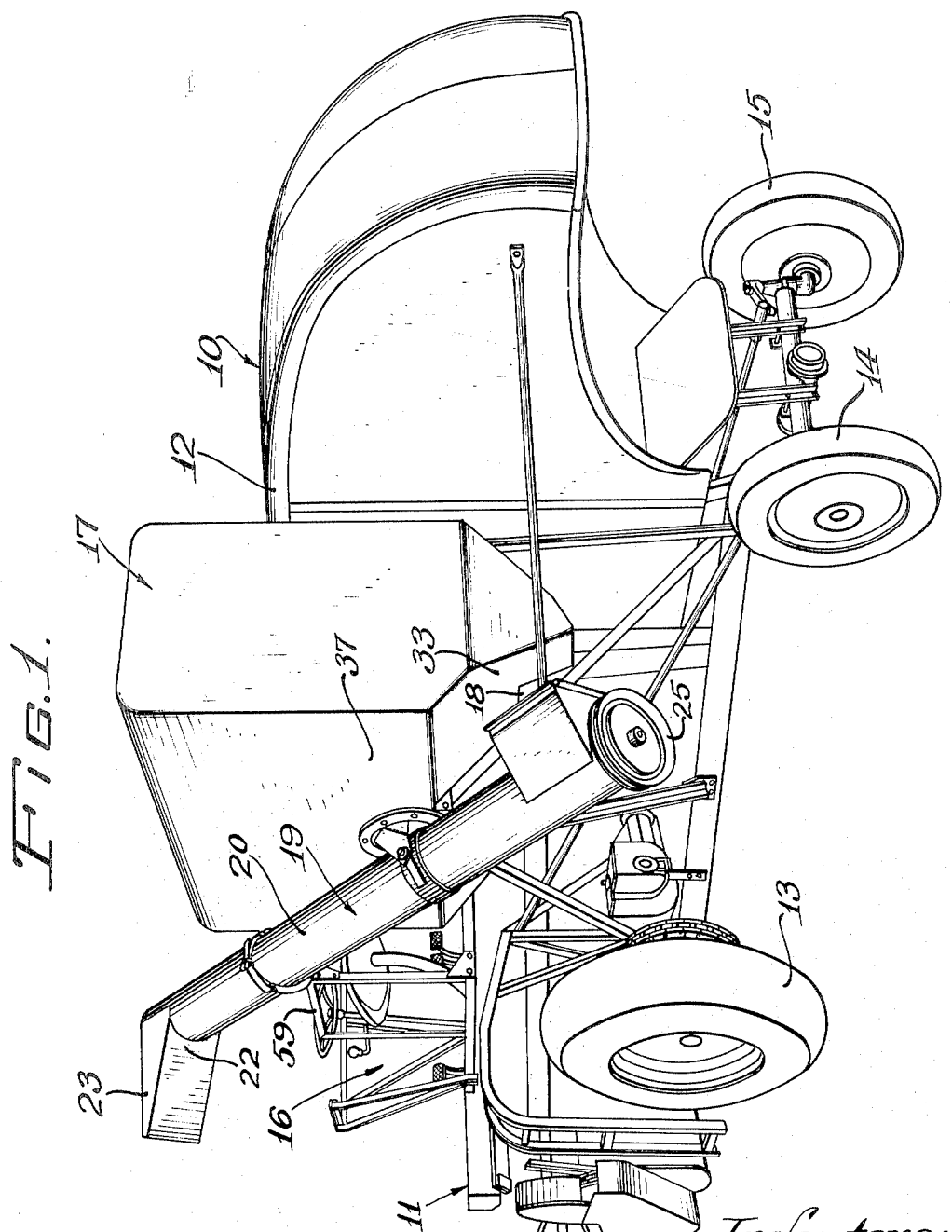
Inventors:
Glen O. Turnbull
Clarence C. Evers
Paul O. Pippel
Atty.

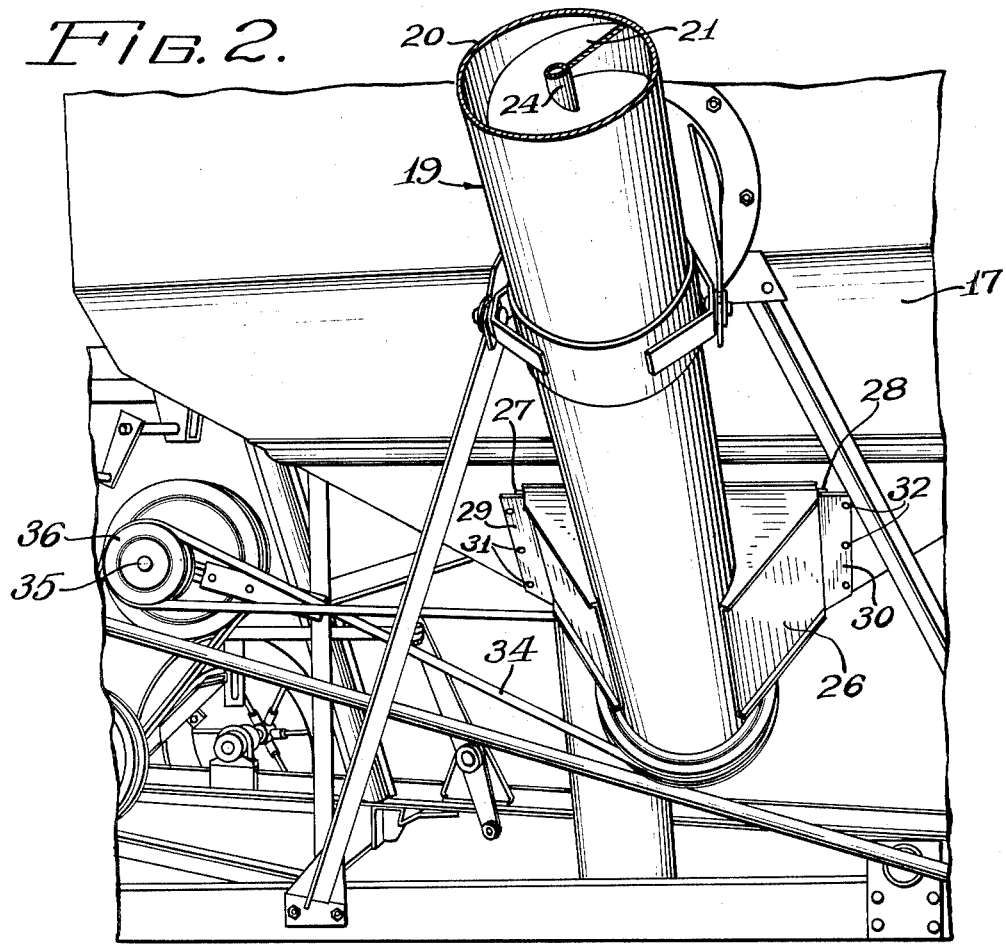
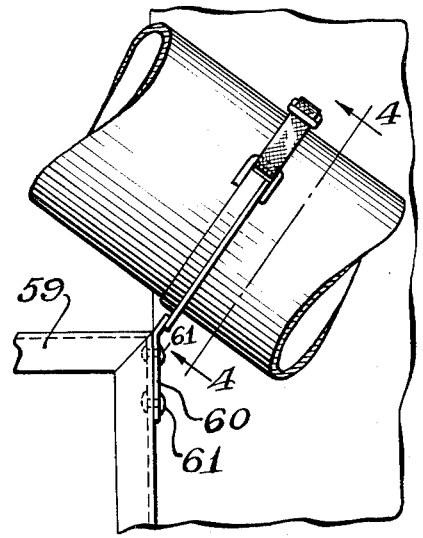
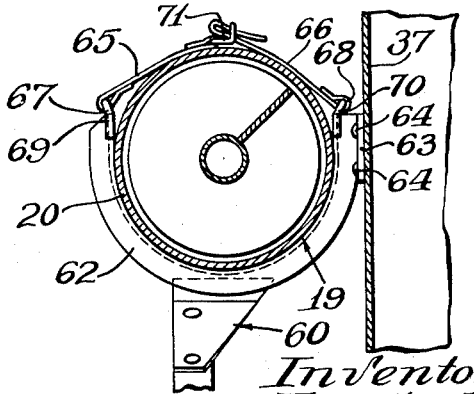

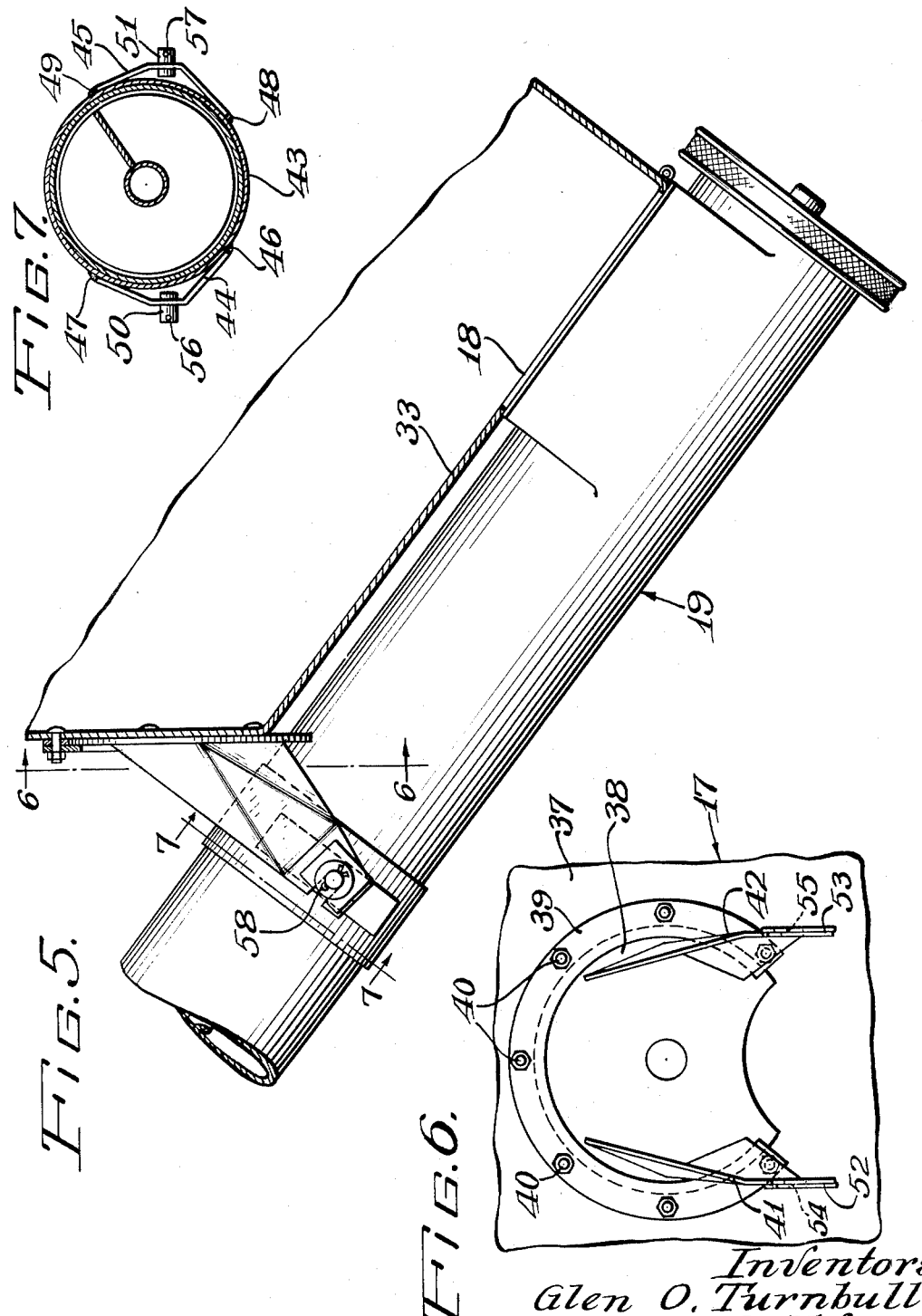

United States Patent Office 2,743,571
Patented May 1, 1956

2,743,571

GRAIN TANK DISCHARGE CONVEYOR FOR HARVESTERS

Glen O. Turnbull, Geneseo, Ill., and Clarence C. Evers, Davenport, Iowa, assignors to International Harvester Company, a corporation of New Jersey Application October 9, 1952, Serial No. 313,965

7 Claims. (Cl. 56—473.5)

This invention relates to a new and improved grain tank discharge conveyor for harvesters.

Harvesting machines and more particularly harvester threshers are arranged and constructed to pass through a field of standing grain and effect a harvesting of the grain and a separation of the grain from the straw. Some harvester threshers employ bagging means for discharging the grain directly into bags, whereas other harvester threshers deposit the harvested and cleaned, separated grain within a grain-receiving tank. The tank thus forms a unitary part of the harvester thresher and there must be available some means for unloading the grain tank at intervals during the harvesting procedure.

It is, therefore, an important object of the present invention to provide means for unloading the grain tank of a harvesting machine.

Another important object of this invention is the provision of means in combination with a grain-receiving tank of elevator conveying means for unloading the grain tank and effecting a discharge of the grain at an elevated position for deposit in a permanent grain storage chamber or a wagon for transporting to permanent storage.

Another and further important object of this invention is to supply a discharge conveyor for grain tanks especially for use on harvester threshers having means for swinging the conveyor means from a relatively high operating position to a relatively low position for convenient transport of the harvester thresher through relatively small passages when the machine is not in operation.

Still another important object of this invention is to provide means in combination with an elevator conveyor for discharging the contents of a grain tank and having a dual functioning hinge mounting wherein the elevator may be swung in two planes to provide for compact assembly of the machine on which the grain tank is mounted preliminary to transport of that machine.

Another and still further important object of this invention is the provision of mounting means for a discharge elevator of a grain tank on a field traversing harvesting machine and wherein the mounting means includes a dual functioning hinge to provide for swinging of the elevator to and away from the grain tank, and also to provide for rotational movement of the elevator about the grain tank.

A further object of this invention is to supply locking means for a grain tank discharging elevator in inoperative position.

Other and further important objects and advantages of this invention will become apparent from the disclosures in the following specification and accompanying drawings.

In the drawings:

Figure 1 is a perspective view of a harvester thresher and unitary grain tank having the grain tank discharge conveyor thereon and shown in transport position;

Figure 2 is an enlarged detailed view substantially in side elevation and parts in section of a portion of the device as shown in Figure 1 and showing the discharge conveyor in operative position;

Figure 3 is an enlarged elevational detailed view partially in section of the conveyor locking means for maintaining the conveyor in transport position;

Figure 4 is a sectional view taken on the line 4—4 of Figure 3;

Figure 5 is an enlarged transverse sectional view taken through the grain-receiving tank and showing the discharge conveyor in operating position therewith;

Figure 6 is an elevational view taken on the line 6—6 of Figure 5; and

Figure 7 is a sectional view taken on the line 7—7 of Figure 5.

As shown in the drawings:

The reference numeral 10 indicates generally a harvester thresher or combine. The combine comprises a harvesting unit 11 positioned at the forward end of the machine and a threshing or separator housing 12 for effecting the removal of the grain from the straw and other trash. The harvester thresher 10 is a field traversing agricultural implement and is adapted to pass through a field of standing grain and effect a harvesting of the standing grain by the forwardly disposed harvesting unit 11 and a threshing of the grain by the unit 12. The particular construction of the combine does not directly bear on the present invention except for the fact that the implement is adapted to support a crop or other receiving tank which must be unloaded at intervals, and the means for accomplishing unloading removed from interference to convenient transport of the agricultural implement. The harvester thresher as shown in Figure 1 is provided with relatively widely spaced apart large traction wheels 13, only one of which is shown, positioned near the forward end of the implement, and relatively small dirigible wheels located at the rearward end of the implement and designated by the numerals 14 and 15. The combine shown is that known as the self-propelled type and thus is equipped with its own power plant, not shown, to effect a transport movement of the implement as well as to accomplish operation of the harvesting unit 11 and the separating and threshing unit 12. The combine is further equipped with an operator's platform 16 with numerous controls thereon to permit operation of the entire machine by a single operator.

Following the completion of the separation and the cleaning of the grain by the unit 12 of the combine 10, the grain is deposited in a relatively large grain-receiving tank 17. The tank thus forms a unitary part of the harvester thresher and when the tank becomes full it is necessary to unload the tank by removing the grain therein to permit further operation of the machine. Very often this removal of grain is made to wagons which are pulled alongside the combine and at other times the grain is removed directly to more permanent grain storage chambers. In any event, it is necessary to provide means for unloading the grain tank 17 and, further, to provide means for suitably elevating the grain during discharge so that it may be deposited in containers such as wagons disposed at substantially the same level as the grain tank and/or even higher than the grain tank.

In the present instance the grain-receiving tank 17 is provided with an opening 18 in the bottom or lower end thereof to permit the grain deposited therein to normally fall by gravity through the opening. The conveyor used for unloading thus is adapted to communicate with the opening 18 to receive harvested grain and discharge the grain where desired.

As shown in Figure 1, the grain elevating conveyor is designated generally by the numeral 19 and it is shown in inoperative or in other words transport position. In order to accomplish all of the desirable characteristics of a grain removing elevator, the elevator must project upwardly from the grain tank and laterally outwardly from the grain tank a substantial distance. Such a positioning of the elevator is, of course, not conducive to ready transport of the implement and thus the present invention is concerned with the mounting of the elevator 19 in such a manner that it may be shiftable to an out-of-the-way transport position. Figure 1 shows the transport position of the grain elevator 19. The elevator 19 comprises an elongated cylindrical housing 20 and a screw type conveyor 21 mounted therein to effect an elevating of grain or other material from the lowermost position of the tubular housing to an upper discharge portion as shown at 22. A deflector 23 is provided at the top of the tubular housing 20 to shield and deflect the grain or other material coming from the discharge opening 22. The screw conveyor 21 is carried on a central shaft 24 which projects downwardly through the bottom of the cylindrical housing 20 and has mounted at this bottom end a pulley 25 whereby rotary motion is imparted to the screw conveyor 21. As best shown in Figure 2, the elevator 19 is shown in grain discharging position with respect to the grain tank 17. A hopper-like housing 26 is attached to the lower portion of the cylindrical housing 20 of the elevator 19 and permits communication of grain entering the hopper 26 to pass through an opening in the cylindrical housing 20 to the auger or screw conveyor 21. The hopper-like housing 26 is equipped with a rectangular opening to coincide with the rectangular opening 18 in the lower portion of the grain tank 17 whereupon grain within the tank may pass through the opening 18 into the hopper 26 and thus be conveyed upwardly by the screw conveyor 21 within the discharging elevator 19. The hopper-like housing 26 is provided with laterally and oppositely extending flanges 27 and 28. The flanges constitute the means to be held down for holding the hopper 26 in aligned position with the opening 18 in the grain tank 17. Auxiliary plates 29 and 30 are adapted to be engaged by bolts 31 and 32, respectively, which pass through the inclined bottom sheet 33 of the hopper 17 and when these bolts are drawn up tightly, the plates 29 and 30 maintain the flanges 27 and 28 flush against the inclined bottom wall 33 of the grain tank. The pulley 25 is driven by a V belt 34 which receives drive from a drive shaft 35 through an intermediate V pulley 36 fixedly mounted on the drive shaft 35.

The discharge elevator 19 is hingedly mounted to the vertical side wall 37 of the grain tank 17. The hinge mounting as stated in the objects above is a dual form of hinge which permits swinging of the elevator 19 through two planes. The dual functioning hinge is shown in considerable detail in Figures 5 and 6 and includes a circularly-shaped support 38 which is held in position by means of a circularly-shaped rim 39 which is fastened to the vertical side sheet 37 of the grain tank 17 by bolts 40. When the bolts 40 are drawn up tightly against the annular ring 39, the ring presses against the circular disc support 38, whereupon the ring 39 performs the dual function of guiding the disc 38 in its rotation and also acts as a clamp to hold the disc 38 against the side sheet 37, thus preventing relative movement of the circular disc 38 with respect to the grain tank 17. However, when the annular path of bolts 40 are loosened the circular disc 38 is permitted rotational movement within and under the circular rim 39. Spaced apart wing members 41 and 42 are formed integrally with the circular disc 38 and extend outwardly and downwardly whereupon together they constitute a yoke support for the discharge elevator 19. As shown in Figure 7 a reinforcing strap or band 43 is positioned around the cylindrical housing 20 of the elevator 19 and there is welded thereto on diametrically opposite sides bracket members 44 and 45. Each of the brackets 44 and 45 which are welded at 46 and 47 and 48 and 49, respectively, carries a hinge pin 50 and 51. The hinge pins 50 and 51 are in axial alignment with one another and thus the elevator 19 may be swung uniformly about these hinge pins in order to enable the lower end of the elevator 19 to be drawn up against the inclined under surface 33 of the tank 17, and to simultaneously cause the upper end of the elevator 19 to be swung outwardly to effect a disposition of the discharge portion of the elevator laterally spaced from the harvester thresher. The yoke forming wings 41 and 42 as shown in Figure 6 are equipped with ears 52 and 53 which are disposed parallel to each other and are provided with aligned apertures 54 and 55 to receive passage of the hinge pins 50 and 51, respectively. Each of the hinge pins is provided with a small opening 56 and 57, respectively, in the outer ends thereof whereby in the assembly of the elevator 19 to the hinge mounting there may be applied cotter pins 58 to pass through the openings 56 and 57 to maintain the elevator 19 in hinging position with respect to the dual functioning hinge.

When the elevator 19 is desired to be shifted, the bolts 31 and 32 are removed and the hold-down plates 29 and 30 taken off so that the flanges 27 and 28 of the hopper-like housing 26 are free to be pulled away from the inclined under surface 33 of the tank 17. The elevator 19 thereupon may be swung about the hinge pins 50 and 51 within the yoke supporting wings 41 and 42 and thus the upper portion of the elevator may be swung closely adjacent the vertical side walls 37 of the grain tank 17. This reduces the overall width of the harvester thresher but it also increases to some extent the height of the harvester thresher, thus making it more convenient to pass through a narrow gate or the like but difficult to pass through the door of a barn or other entrance. Thus it is then desirable to loosen the bolts 40 and effect a rotation of the disc 38 and thus also the entire elevator 19, resulting in a forward tilting of the upper portion of the elevator 19 whereupon the overall height of the machine is not increased by the elevator as was done when the elevator was merely swung through one portion of the dual hinge. The dual operating hinge insures that the elevator may be swung to an inoperative position during non-use of the harvester or during transport thereof and to a position which will minimize the overall size of the implement.

The operator's platform 16 includes a railing structure 59. A bracket 60 is riveted or otherwise fastened as at 61 to the railing structure 59. An elevator resting cradle 62 is fixedly attached to the bracket 60 and is adapted to receive the cylindrical housing 20 of the elevator 19 when the elevator is moved to inoperative or transport position. The cradle 62 is further supported by the attachment to the vertical side wall 37 of the grain tank 17. Flange 63 formed integrally with the cradle 62 is riveted as shown at 64 to the grain tank side wall 37. In order that the elevator 19 may be securely held within the cradle for suitable transport, straps 65 and 66 are hingedly mounted at their one ends at 67 and 68, respectively, to upwardly and outwardly extending ear-like brackets 69 and 70 formed on the upper ends of the cradle 62. The strap 65 is provided with a buckle or the like 71 at its upper end and is adapted to receive the other end of the strap 66 whereby the elevator 19 may be locked within the cradle 62.

In operation the harvester thresher of this invention is driven through a field of standing grain causing grain to be harvested and separated and the clean grain deposited within the grain-receiving tank 17. With the elevator 19 in the position as shown in Figures 2 and 5 a grain tank 17 may be conveniently unloaded by imparting rotational drive to the V pulley 25 through the medium of the driving V belt 34. This actuates the screw conveyor 21 within the cylindrical housing 20 of the elevator 19 and grain within the tank 17 thus falls through the opening 18 in the inclined bottom thereof downwardly into the hopper-like receiving housing 26 and thence upwardly through the cylindrical housing 20 for discharge upwardly and laterally outwardly of the harvester thresher through the discharge opening 22 of the elevator 19. The deflector cover 23 at the upper and outer end of the elevator 19 guides the grain in its departure from the cylindrical housing 20 downwardly into the receiving container, whether it be a moving wagon or a stationary grain storage chamber. When it is desired to effect transport of this harvester thresher or any agricultural implement which might employ a discharge elevator for a storage tank, the elevator 19 is swung in two directions about its dual hinge as shown in detail in Figures 5, 6 and 7. The initial step is to remove the bolts 31 and 32 from the locking straps or plates 29 and 30, thus permitting the outward removal of the hopper-like housing 26 from its position under and in alignment with the rectangular opening 18 in the lower end of the grain tank 17. When the removal of the plates 29 and 30 is complete the elevator 19 may then be swung about its aligned hinge pins 50 and 51 whereupon the elevator 19 is in a substantially vertical position. The succeeding step in converting the machine to transport position is to loosen the bolts 40 on the circular guide rim 39, thus permitting a rotation of the elevator 19 about the center of the disc 38 whereby the elevator is inclined forwardly and downwardly from front to rear and the upper end of the elevator 19 rests in the cradle 62 formed at the forward portion of the grain tank 17. The straps 65 and 66 are then applied over the top of the cylindrical housing 20 of the elevator 19 and are joined by the buckle 71, whereby the elevator is locked in transport position with the overall dimensions of the harvester at a minimum.

Numerous details of construction may be varied throughout a wide range without departing from the principles disclosed herein and we, therefore, do not propose limiting the patent granted hereon otherwise than is necessitated by the appended claims.

What is claimed is:

1. A grain tank and discharge elevator therefor for use in conjunction with a field traversing agricultural implement comprising a grain tank having an opening in the lower end thereof, a discharge elevator, means mounting said discharge elevator intermediate the ends thereof on to said grain tank, and hinge means in said means mounting for swinging movement of the elevator in two directions, said discharge elevator having one end thereof communicating with the grain tank opening in a first position of the discharge elevator, said discharge elevator having an upper grain delivery portion spaced upwardly and laterally outwardly of said grain tank in the first position of said discharge elevator, and said hinge means arranged and constructed to permit swinging movement of said discharge elevator to a second substantially upright position adjacent said grain tank with the one end in non-communicating positions with respect to said grain tank opening and to permit subsequent swinging movement of said discharge elevator to a third fore and aft tilted position.

2. A device as set forth in claim 1 in which the hinge means includes a disc member as a part of said discharge elevator, an annular guide member on said grain tank, means adjustably fastening said disc in any angular position within said annular guide member, a yoke on said disc member, hinge pins affixed to said discharge elevator and journally mounted in said yoke whereby the discharge elevator may be moved to a second position about the hinge pins and to the third position about the disc and annular guide.

3. A grain tank and a discharge elevator therefor, comprising a grain tank having at least one substantially vertically disposed wall and an inclined bottom wall joined thereto having an opening therethrough, a discharge elevator having an elongated tubular housing, means at one end of said tubular housing for removably fastening to the underside of the inclined bottom wall over said opening whereby the grain tank has direct communication with said discharge elevator, means mounting an intermediate portion of said elongated tubular housing to said vertically disposed wall of the grain tank, and hinge means in said means mounting arranged and constructed to permit movement of the discharge elevator through two planes of movement.

4. A device as set forth in claim 3 in which said hinge means includes an annular ring combination guide and clamp member removably fastened to said vertically disposed wall of the grain tank, a disc member rotatably adjustable within said annular ring member, a yoke affixed to said disc, aligned pin means on said yoke arranged and constructed to hingedly carry said discharge elevator, whereby when the fastening of the discharge elevator to the underside of the grain tank is removed the elevator assumes a vertical position by swinging about the aligned pin means, and the discharge elevator may thereafter be inclined in another plane by loosening the disc clamping annular ring and rotating the disc therewithin.

5. A device as set forth in claim 4 in which cradle means is provided on said grain tank for supporting said discharge elevator in moved position.

6. A device as set forth in claim 5 in which locking means is associated with said cradle means whereby the discharge elevator may be locked in its moved position.

7. A device as set forth in claim 6 in which the grain tank is mounted on a field traversing harvester whereby the elevator may be moved and locked in moved position for convenient transport.

References Cited in the file of this patent

UNITED STATES PATENTS

| Number | Name | Date |
|---|---|---|
| 667,335 | Record | Feb. 5, 1901 |
| 700,886 | Atkinson | May 27, 1902 |
| 1,381,328 | Morrissey | June 14, 1921 |
| 1,401,837 | Vogt | Dec. 27, 1921 |
| 2,439,541 | Hall | Apr. 13, 1948 |
| 2,507,873 | Ward | May 16, 1950 |
| 2,585,169 | Potter | Feb. 12, 1952 |
| 2,585,414 | Steffens | Feb. 12, 1952 |
| 2,675,932 | Potter | Apr. 20, 1954 |